(12) United States Patent
Stepper

(10) Patent No.: US 6,783,238 B1
(45) Date of Patent: Aug. 31, 2004

(54) METHOD FOR MAGNETICALLY CONNECTING ACCESSORIES TO EYEGLASSES

(75) Inventor: Hans Stepper, Kowloon (HK)

(73) Assignee: Arts Optical Co., Ltd., Kowloon (HK)

( * ) Notice: Subject to any disclaimer, the term of this patent is extended or adjusted under 35 U.S.C. 154(b) by 0 days.

(21) Appl. No.: 10/460,090

(22) Filed: Jun. 11, 2003

(51) Int. Cl.⁷ .......................... G02C 13/00; G02C 9/00
(52) U.S. Cl. ........................................ 351/178; 351/47
(58) Field of Search ............................ 351/47, 57, 178

(56) References Cited

U.S. PATENT DOCUMENTS 5,786,880 A * 7/1998 Chao ........................... 351/41
6,412,942 B1 * 7/2002 McKenna et al. ............ 351/47

2002/0097372 A1 * 7/2002 Zelman ........................ 351/47

* cited by examiner

*Primary Examiner*—Huy Mai
(74) *Attorney, Agent, or Firm*—Alix, Yale & Ristas, LLP

(57) ABSTRACT

A method of magnetically connecting plastic framed eyeglasses to accessories comprises preparing a primary plastic spectacle frame with thermo-plastically moldable and magnetizable materials injected in designed locations to form plurality of areas integral into the frame by double injection molding. The mating accessory is prepared with magnetizable material sections which at least can partially touch said areas. Said areas or said sections or both are optionally permanently magnetized devices. This inventive method is compatible with many prior art using magnetic clip-ons and can magnetically connect glass lenses directly onto the plastic frame of an optical spectacle without appearing that each spectacle has two lenses. This inventive method can also be used for metal frames, especially for non-magnetizable ones.

14 Claims, 5 Drawing Sheets

METHOD FOR MAGNETICALLY CONNECTING ACCESSORIES TO EYEGLASSES

TECHNICAL FIELD

This invention relates to eyewear. More particularly, this invention relates to eyeglasses which can easily be connected to auxiliary appliances.

BACKGROUND OF THE INVENTION

Any eyeglasses designed for one purpose can be added with auxiliary accessories for expanding its usage. For example, it is a well-known and long-time practice that one transforms optical spectacles into sunglasses by placing a clip-on (a kind of accessories) in front of the optical frame. Initially these clip-ons were attached to the optical frames mechanically by little hooks that were clinging around the rims. Further improvement had been made by using little magnets which enabled the clip-ons to attach to the optical frame magnetically (see U.S. Pat. No. 6,170,949). The eyepiece in U.S. Pat. No. 6,412,942 was later disclosed to use discrete heat-treated magnetic alloy as the sunglass frame and magnetizable material as the optical frame. In doing so, both frames must be configured to magnetically couple to each other. The difference between U.S. Pat. No. 6,170,949 and U.S. Pat. No. 6,412,942 is that the former requires clip-on action so that there are some points of contacts between the frames, whereas the latter gives up the idea of clip-on and shows that the two frames seamlessly stick to each other.

In U.S. Pat. No. 6,412,942, expensive magnetic alloy must be used and complicated technique needs to be adopted to strengthen the frame for holding the lens. Since magnetic connection is made between two wholly fitted frames, the aesthetic appearance is not good. One can clearly tell that the eyeglasses user is wearing two different pairs of frames. Besides, the total weight of two pairs of eyeglasses is rather heavy, even if most of the prior art use light-weighted metallic frames.

Nowadays, plastic frames are popular and the above-mentioned prior art cannot be used when the frames are plastic. Accordingly, a new, cheaper and simpler method should be developed for plastic frames.

SUMMARY OF THE INVENTION

An object of this invention is to provide magnetic connection method for eyeglasses using plastic frames. This new method is compatible to all prior arts such as U.S. Pat. No. 6,170,949 and U.S. Pat. No. 6,412,942. That is to say, all accessories used in said prior arts, no matter whether they are clip-on type or wholly-fit-frame type, can use this invention. Furthermore, this invention also enables the accessories to magnetically connect to the eyeglasses without frames.

In order to achieve the said object, this invention may include the following steps:

Firstly, to prepare a primary plastic spectacle frame with thermo-plastically moldable and magnetizable materials injected in designed locations to form plurality of areas integral into the frame by double injection molding;

Secondly, to prepare mating accessories with magnetizable material sections which at least can partially touch said areas;

Thirdly, to optionally permanently magnetize said areas or said sections or both.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Figure 1B:
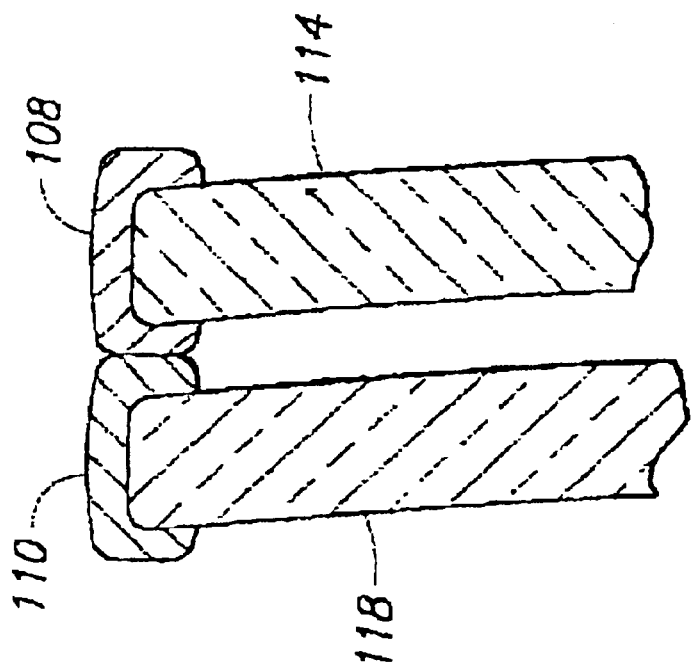
FIG. 1(b) is a sectional view of the prior art frames of FIG. 1(a)
Figure 1A:
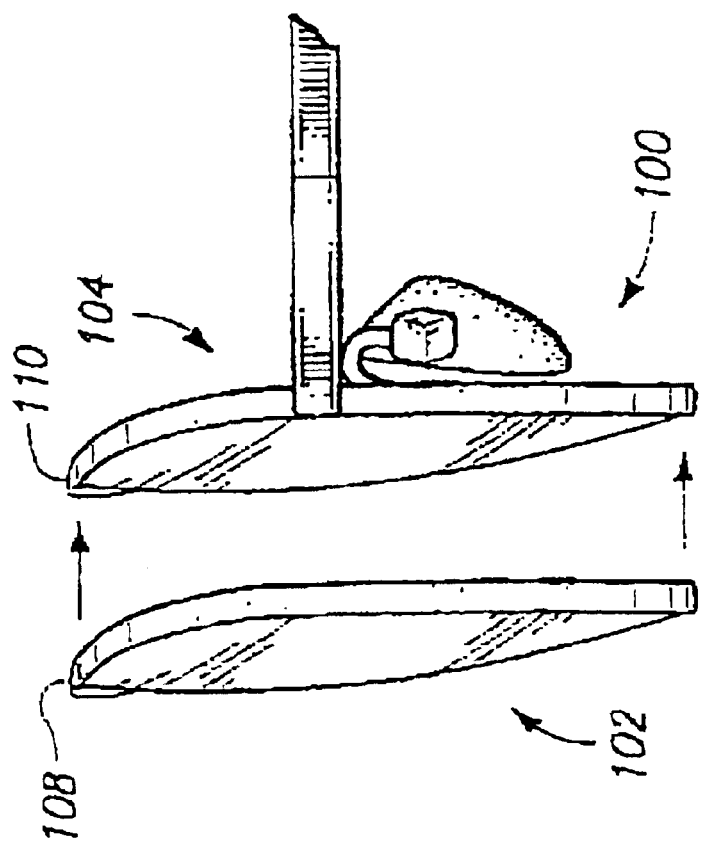
FIG. 1(a) is a side view of prior art for showing the two wholly-fit frames.

FIGS. 1(a) and 1(b) are respectively a side and a sectional view representative of U.S. Pat. No. 6,412,942 for showing two wholly-fitted frames. In FIG. 1, the optical eyeglasses 104 and its accessory (a sunglass) 102 are shown in side views. Their combination is 100. The optical eyeglasses 104 comprise a frame 110 and primary lens 118. The sunglass 102 comprises a frame 108 and auxiliary lens 114. At least one of said frames 108 or 110 should be permanently magnetized. The section view in FIG. 1 shows that two frames 108 and 110 should be wholly-fitted to each other in order to get maximum magnetic coupling.

Figure 2:
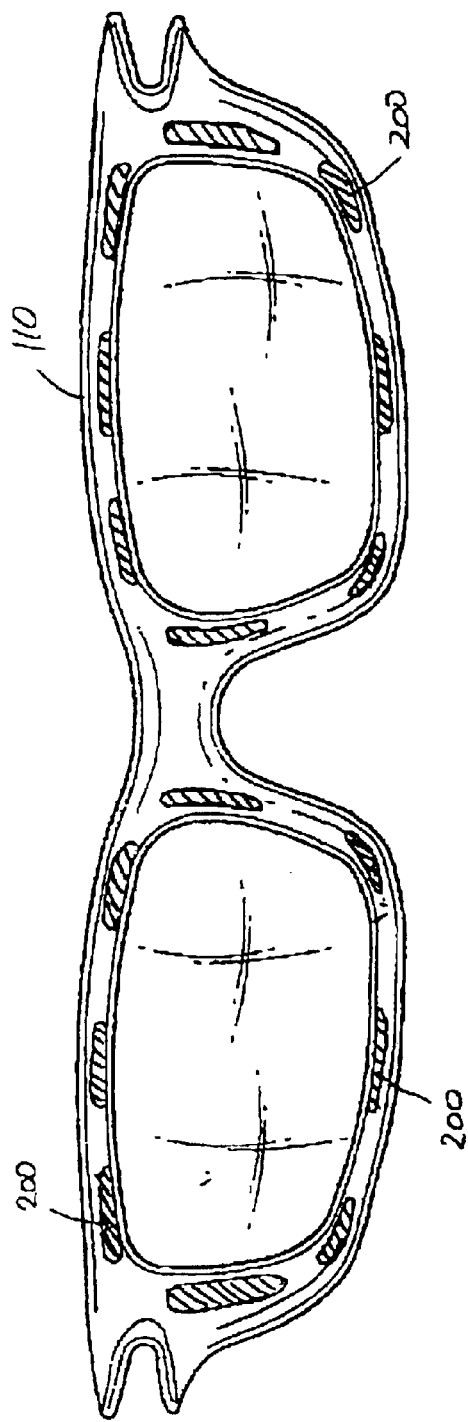
FIG. 2 is a front view of first embodiment of this invention for showing the injection location of thermo-plastic magnetizable material used for wholly-fit type accessories.

FIG. 2 is a front view of first embodiment of this invention for showing the injection location of thermo-plastic magnetizable material used for wholly-fit-frame type accessories, for example, to compatible sunglass 102 in FIG. 1. In FIG. 2, hatched areas 200 on plastic eyeglasses frame 110 are recommended for injecting with thermo-plastically moldable magnetizable material such as plastic base mixed with ferromagnetic powder in virgin state. Since said areas will reduce mechanical strength of frame 110, it is better not to design an area too big in any narrow location. Since these areas are in magnetic virgin state, if the sunglass 102 of U.S. Pat. No. 6,412,942 has permanently magnetized frame 108, these areas 200 will act as common ferrite material and can be magnetically coupled with frame 108. If the sunglass 102 of U.S. Pat. No. 6,412,942 has frame 108 not permanently magnetized, these areas 200 can be permanently magnetized by traditional method such as by an electromagnet for attracting said frame 108. In case a stronger attraction is required, both frame 108 and frame 110 can be magnetized. While in doing so, the magnetic polarity of both frames 108 and 110 must be coupled.

Figure 3:
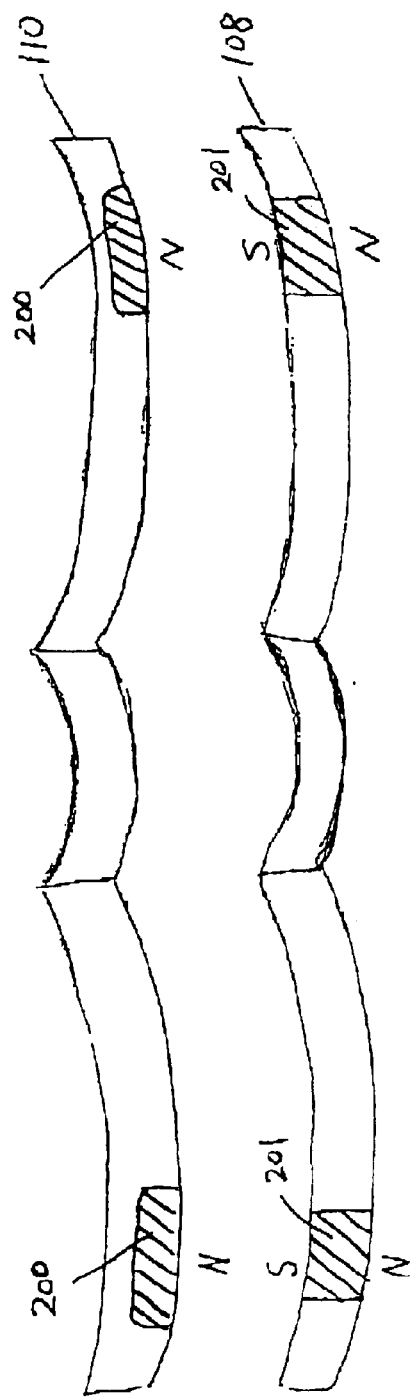
FIG. 3 is a top view of a first embodiment of this invention for showing magnetic polarity of two mating frames must be coupled.

FIG. 3 is a top view of a first embodiment of this invention for showing the magnetic polarity of two mating frames must be coupled. In FIG. 3, the frame 110 of this invention has injected thermoplastic magnetizable material areas 200 (only two areas 200 have been shown) and the frame 108 of prior art sunglass has discrete frame sections 201 (also only two sections 201 have been shown) with magnetic polarization direction as shown. Therefore, in contacting surfaces, both frames 108, 110 must have hetero-polarities. In FIG. 3. frame 108 has S-polarity in said contacting surface and frame 110 has N-polarity in said contacting surface. Besides, areas 200 of frame 110 must be aligned with sections 201 for getting maximum attracting force.

Figure 4:
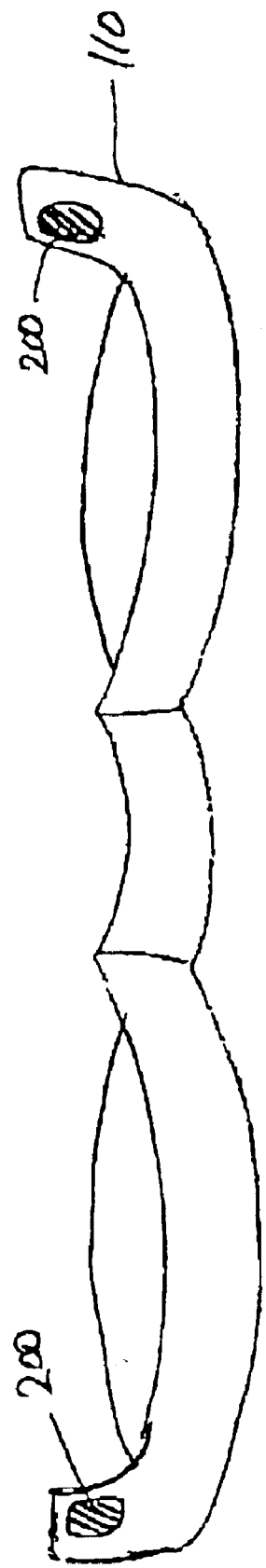
FIG. 4 is a top view of a second embodiment of this invention for showing the injection location of thermo-plastic magnetizable material used for clip-on type accessories.

FIG. 4 is a top view of second embodiment of this invention for showing the injection location of thermoplastic magnetizable material used for clip-on type accessories. In this case, the frame 110 may have two short trunks turned backward for locating said areas 200. In doing so, any prior art magnetic clip-on of U.S. Pat. No. 6,170,949 can be used on this invention. Of course, before permanently magnetized said areas 200, the direction of intended magnetic polarity must be known.

Figure 5:
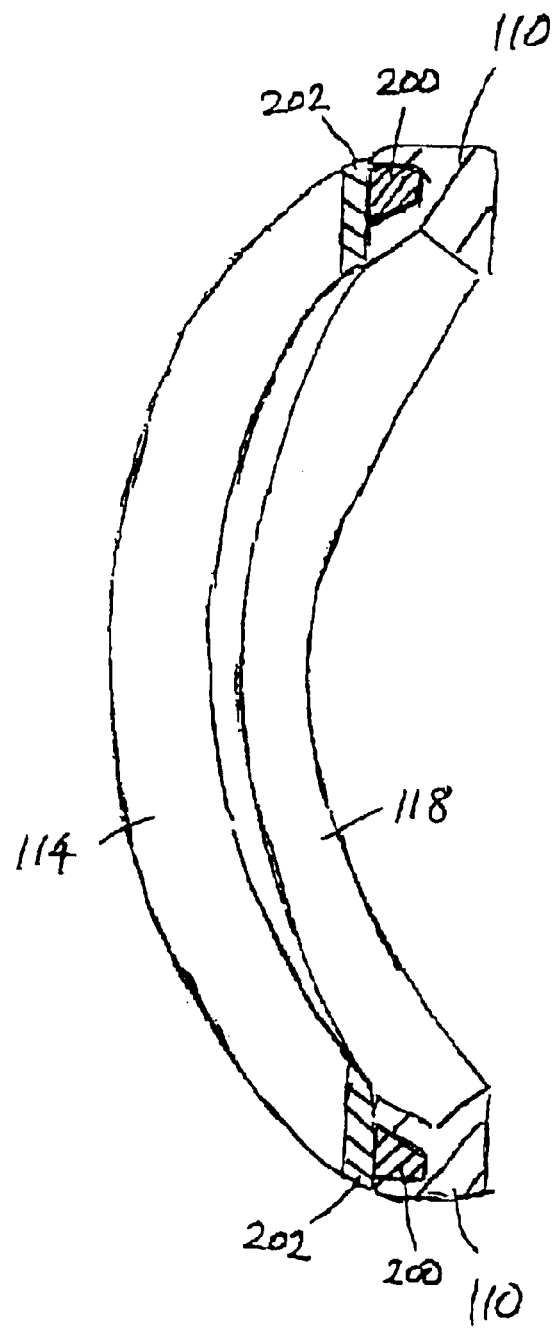
FIG. 5 is a side section view of a third embodiment of this invention for showing the frame of this invention and how to attract additional lens.

FIG. 5 is a side section view of third embodiment of this invention for showing the frame of this invention how to attract additional lens. In FIG. 5, the frame 110 receives a primary lens 118, in this case, a concave lens is used for example purposes. Commonly, the curvature of convex surface of a concave lens is constant, while the curvature of concave surface of a concave lens should be changed for fit the user. Therefore, the sunglass lens 114 can be manufactured with its concave surface slightly clear from the convex surface of lens 118, and with its edge fitly contacted to the front surface of said frame 110. Said contacting edge of lens 114 can be glued a layer 202 in suitable thickness of thermo-plastic magnetizable material such as the same material used for areas 200. In doing so, both lens 114 and frame 110 can be magnetically connected to each other with wholly-fit-frame type. If said layer 202 is also magnetized, the attraction force will be as large as what is disclosed in U.S. Pat. No. 6,412,942 while the cost will be greatly reduced. Besides, the aesthetic appearance will be good since nobody can easily find that the eyeglasses 100 is comprising of each 2 lenses. For removing the sunglass 114, one corner on the periphery of the lens 114 edge can be intentionally protruded from the frame 110 for removal of the lens by use of a fingernail.

Figure 6:
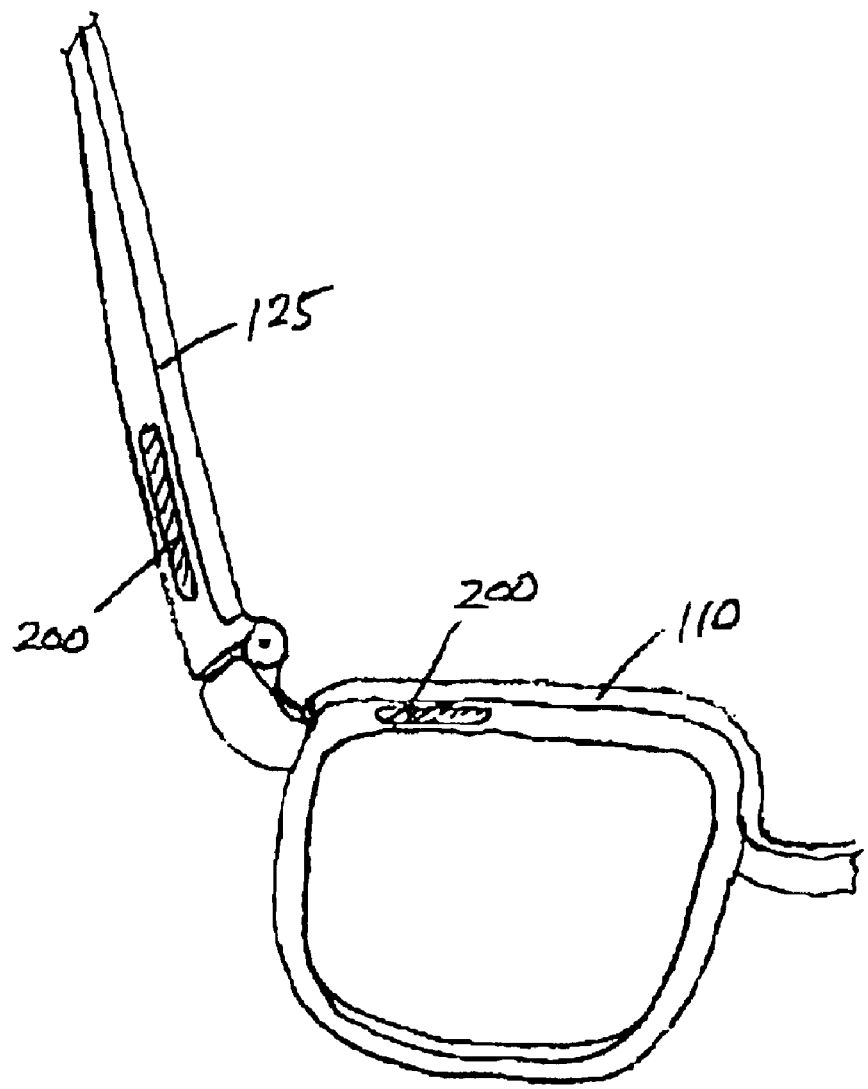
FIG. 6 is a perspective view of a fourth embodiment of this invention for showing how to employ this invention in metal frames.

FIG. 6 is a perspective view of a fourth embodiment of this invention for showing how to employ this invention in metal frames. In FIG. 6, the metal frame 110 and the metal leg 125 are embedded with said areas 200 of this invention. In doing so, the metal frame shall be no longer made of magnetizable metals. The double injection molding of the invention involves forming the frame of the eyepiece in a mold which is injected with plastic and then the same mold is injected with magnetizable material onto or into the same preformed frame. The double injection method is recommended to embed said areas 200 onto (or into) metal frame (including metal legs etc.). Of course, other methods such as to paste, clamp, envelop, etc. can also be used for this purpose. This will greatly reduce the cost of prior art U.S. Pat. No. 6,412,942.

In the third embodiment mentioned above a sunglass 114 is used, while in practice, lens 114 is not limited to sunglass lens, and any kind of lens can also be used. Therefore, the inventive method of this invention permits the user to have a set of lenses, such as, sunglass lenses, reading lenses, far-sighting lenses, etc, etc.

What is claimed is:

1. A method for an accessory to magnetically connect plastic framed eyeglasses comprising:

preparing a primary plastic spectacle frame with thermoplastically moldable magnetizable materials injected in designed locations to form plurality of areas integral into the frame by double injection molding; and preparing mating accessory with magnetizable material sections which at least can partially touch said areas.

2. The method of claim 1, wherein said thermo-plastically moldable magnetizable materials include a mixture of plastic base with ferromagnetic powder in virgin state.

3. The method of claim 1, wherein said plurality of double-injection-molded areas are placed on the frame around the primary lenses and can be magnetically touchable from the front surface of said frame.

4. The method of claim 1, wherein said accessory is a clip-on type sunglass.

5. The method of claim 1, wherein said accessory is a wholly-fitted-frames type sunglass.

6. The method of claim 1, wherein said accessory is a lens with a magnetizable material layer on its edge.

7. The method of claim 1, wherein said magnetizable material sections are made of any of magnetic alloys.

8. The method of claim 1, wherein said magnetizable material sections are made of the same material of said areas.

9. The method of claim 1, wherein said areas which partially touch include several portions which point-to-point touch.

10. The method of claim 1, further comprising permanently magnetizing at least one said area or said section.

11. The method of claim 10 wherein said permanent magnetizing is carried out by traditional electromagnet.

12. A method for magnetically connecting metal framed eyeglasses accessories comprising:

preparing a primary metal spectacle frame with thermoplastically moldable magnetizable materials injected in designed locations to form plurality of areas integral into the frame by injection molding; and preparing a mating accessory with magnetizable material sections which at least can partially touch said areas.

13. The method of claim 12, wherein said metal is non-magnetizable.

14. The method of claim 12, further comprising permanently magnetizing at least one said area or said section.

* * * * *